March 10, 1936.  C. W. FARMER  2,033,697
LAMINATED BELTING
Filed April 29, 1935
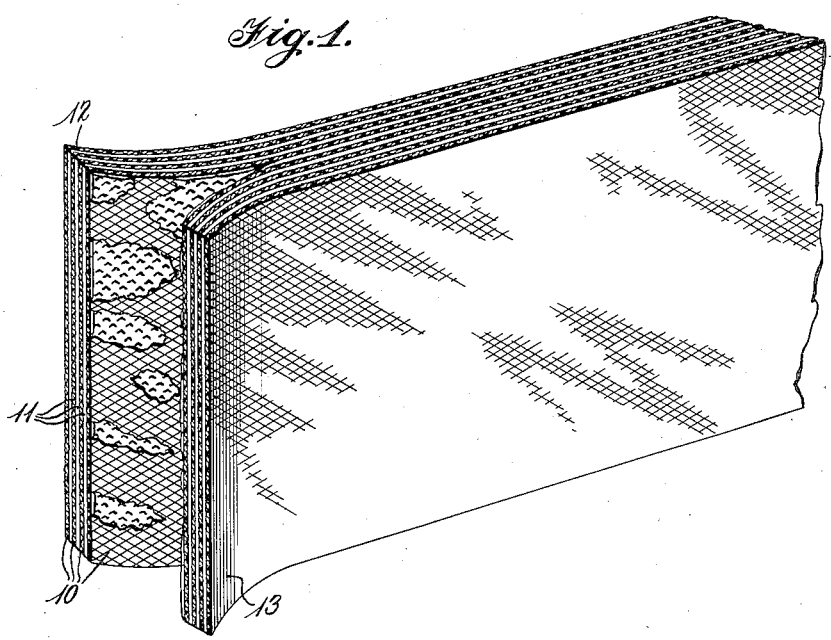
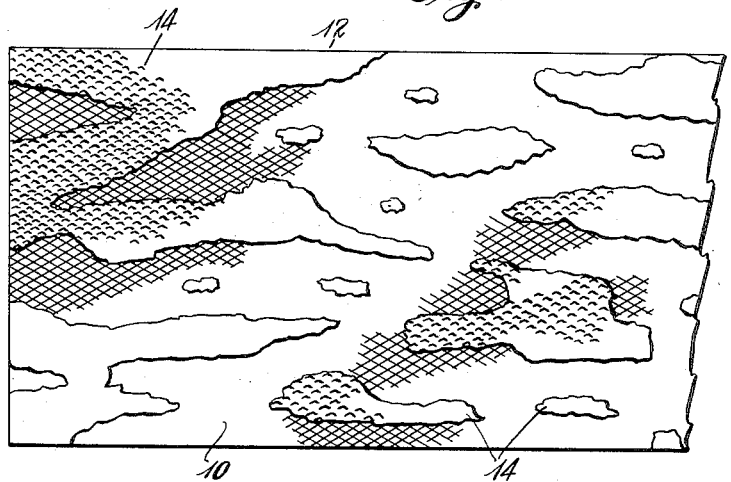
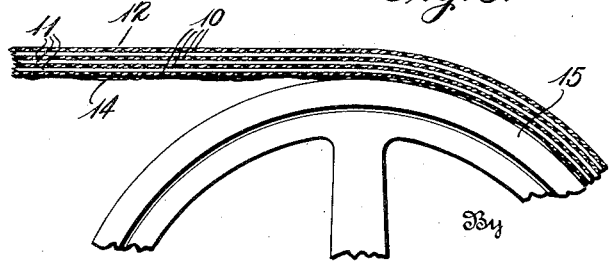
Inventor
Charley W. Farmer
By
Robert F. Davis
Attorney Patented Mar. 10, 1936

2,033,697

UNITED STATES PATENT OFFICE 2,033,697

LAMINATED BELTING

Charley W. Farmer, Macon, Ga.

Application April 29, 1935, Serial No. 18,954

6 Claims. (Cl. 154—4)

This invention relates to the art of laminated belts and particularly to an improved laminated belt of the type that consists of laminations of fabric adhered together by interlying layers of rubber. The invention also includes a process for the manufacture of the new belting in an expeditious and highly economical manner.

In the use of belting, one of the important difficulties is slippage. To overcome the tendency of belts to slip, they are usually treated at regular intervals with a belt dressing. This is expensive and troublesome, however, so that other ways of preventing slippage have long been sought. Round or V-belts present some advantages with respect to slippage, but are unsatisfactory for most power installations because they are mechanically inefficient and quite expensive to manufacture. Belts with a "tread" molded onto their surfaces, much as a tread is molded onto an automobile tire, have also been tried, but without great success because of the expense of molding and the fact that the tread rapidly wears off.

According to the present invention, many of the difficulties are avoided and a superior belt produced cheaply, easily and with a minimum of equipment, by simply taking one of the ordinary laminated fabric-rubber belts and stripping from one or both surfaces, one or more plies of the fabric. The surface of the belt, after the fabric has been removed, consists of the underlying layer of fabric, covered in spots by rubber which has adhered to it, and bare in other spots where the rubber has adhered more strongly to the removed ply or plies. The surface of the rubber carries the imprint of the fabric which has been removed and forms an excellent gripping surface that does much to prevent slippage. Even after the belt has been used for some time and the print of the fabric is worn from the surface, the remaining spots of rubber on the surface of the belt still cause the belt to cling tightly to the surface of the pulleys.

While only a single ply of fabric need be removed from the belt to provide the desired surface, it has been found that if a belt having a considerable number of plies be split into portions each having enough plies to make it usable as a belt, each new belt will have at least one of the new friction surfaces. Obviously, this saves the waste that is caused when the ply that is stripped off, must be discarded.

In order to illustrate the invention, the drawing shows in:

Figure 1, a perspective view of a multi-ply belt partially split to produce two belts of less thickness;

Figure 2, a plan view of the surface of one of the new belts; and

Figure 3, a side view of one of the new belts as it passes around a portion of a pulley.

The particular belt illustrated consists of a series of laminations 10 of fabric and a series of interlying layers 11 of rubber. As the original belt is split, a part of the rubber adheres to the ply on one side and a part to the ply on the other. Thus, there are formed two smaller belts 12 and 13, each having a surface that carries spots 14 of rubber scattered at random over it. In use the belt may be passed around a pulley 15 with the rubber spots 14 on the side that bears against the pulley as shown in Figure 3.

While the new belting has been described merely as made from ordinary laminated rubber-fabric belting, it may, of course, be made of other laminated fabric-adhesive belting if the adhesive will function as does the rubber in the case of the belting described. Also, the invention is particularly applicable for use with short lengths of large size belts and with partly worn belting.

In the merchandising of belting, short lengths of large size belting are often left over and constitute expensive losses. While these pieces are too short for use as large size belts, many of them are still as long or longer than it is necessary for smaller belts to be. Hence these pieces of belting may be split according to the present invention to make one or more thinner belts and, if desired, each of the thinner belts may also be cut longitudinally to make one or more narrower belts. These smaller belts then find a ready market.

Worn belting may be similarly pulled apart and/or split longitudinally into smaller belts that are readily usable. In doing this, the outer plies may be discarded if they are worn and sections that are badly worn may be completely cut out of the belt.

I claim:

1. A method of making a belt having an improved friction surface, that comprises removing from a laminated rubberized fabric belt, one or more of its plies, to leave a surface covered with random spots of rubber.

2. A method of making a plurality of laminated belts each having at least one improved friction surface, that comprises stripping a plurality of plies from at least one face of a laminated fabric-rubber belt to leave a surface on the remainder of the belt and a surface on the stripped plies, each carrying random spots of rubber.

3. A method of making a belt having two improved friction surfaces that comprises stripping from each face of a laminated fabric-rubber belt at least one ply, to leave a surface carrying spots of rubber scattered at random thereover.

4. A method of utilizing left-over pieces of laminated fabric belting that are too short for use as belts of their present thickness, that comprises separating the belting into belts having a fewer number of plies, which belts are usable.

5. A method of utilizing left-over pieces of laminated fabric belting that are too short for use as belts of their present width and thickness, that comprises separating the belting into belts having a fewer number of plies, and splitting the belts so formed longitudinally to make narrower belts, which belts are usable.

6. A laminated belt having an improved friction surface, that comprises a laminated belt at least one surface of which is covered by spots of rubber scattered at random thereover.

CHARLEY W. FARMER.